(12) United States Patent
Lawrence et al.

(10) Patent No.: US 8,434,373 B2
(45) Date of Patent: May 7, 2013

(54) CONE TYPE VENTURI INTEGRATED VALVE DEVICE

(75) Inventors: Philip Andrew Lawrence, Houston, TX (US); Bong-Ku Kim, Seoul (KR); Jin-Ho Seol, Seoul (KR); Yong-Ha Kim, Seoul (KR)

(73) Assignees: Hitrol Co., Ltd, Gyeonggi-Do (KR); Cameron International Corporation, Houston, TX (US)

( * ) Notice: Subject to any disclaimer, the term of this patent is extended or adjusted under 35 U.S.C. 154(b) by 202 days.

(21) Appl. No.: 12/734,701

(22) PCT Filed: Jan. 20, 2010

(86) PCT No.: PCT/KR2010/000364
§ 371 (c)(1),
(2), (4) Date: Jun. 8, 2010

(87) PCT Pub. No.: WO2010/085084
PCT Pub. Date: Jul. 29, 2010

(65) Prior Publication Data
US 2011/0041622 A1    Feb. 24, 2011

(30) Foreign Application Priority Data
Jan. 23, 2009  (KR) ............... 10-2009-0005979

(51) Int. Cl.
*G01F 1/44*    (2006.01)
(52) U.S. Cl.
USPC .................................. 73/861.63; 73/861.65

(58) Field of Classification Search ............... None
See application file for complete search history.

(56) References Cited

U.S. PATENT DOCUMENTS

| | | | | |
|---|---|---|---|---|
| 4,638,672 A | * | 1/1987 | McCall | 73/861.52 |
| 4,812,049 A | * | 3/1989 | McCall | 366/174.1 |
| 4,879,912 A | * | 11/1989 | Suckow | 73/861.61 |
| 5,814,738 A | * | 9/1998 | Pinkerton et al. | 73/861.55 |
| 6,868,741 B2 | * | 3/2005 | Harman | 73/861.65 |
| 7,500,405 B2 | * | 3/2009 | Gongaware et al. | 73/861.52 |
| 7,654,154 B2 | * | 2/2010 | Garnett et al. | 73/861.52 |
| 7,819,022 B2 | * | 10/2010 | Hope | 73/861.52 |
| 2002/0040607 A1 | * | 4/2002 | Kleven | 73/861.52 |
| 2003/0188586 A1 | * | 10/2003 | Orleskie et al. | 73/861.61 |

\* cited by examiner

*Primary Examiner* — Harshad R Patel
(74) *Attorney, Agent, or Firm* — Wenderoth, Lind & Ponack, L.L.P.

(57) ABSTRACT

A cone type venturi integrated valve device includes a main body, a venturi cone, a valve path, and valves disposed in the valve path. The main body has a venturi path which penetrates though the main body in a horizontal direction and a hole which penetrates through the main body from the venturi path to a bottom of the main body, wherein the venturi path includes an inlet, an outlet, a first pressure point P1 at a distance from the inlet, and a second pressure point P2 at a distance from the outlet. The venturi cone is mounted between the first pressure point P1 and the second pressure point P2 in the venturi path of the main body. The venturi cone has a fixing leg bent downward and a bent end of the fixing leg is inserted into the hole of the main body and attached by welding.

8 Claims, 2 Drawing Sheets

CONE TYPE VENTURI INTEGRATED VALVE DEVICE

TECHNICAL FIELD

The present invention relates to a valve device, and more particularly relates to a valve device into which a cone type venturi for flow measurement is integrated.

BACKGROUND ART

In general, venturi cones are widely used for measuring of flows using differential pressure between an inlet and an outlet. A valve is installed together with cone type venturi.

DISCLOSURE OF INVENTION

Technical Problem

However, according to the conventional way, fluid leakage could occur from a connecting part between the flow measurement part and the valves. It is also necessary to adjust heights between both of the pressure taps during connection of the valves and flow measurement parts. This adjusting process is quite cumbersome and takes long time. Also, the conventional valve device has a disadvantage in that bending of pipes could be happened due to the over-heating produced during the process of welding two pieces of nipples and one piece of cone support rod for installation.

Solution to Problem

The present invention provides a cone type venturi integrated valve device for flow measurement, which is formed by integrating valves and a cone type venturi into a one-body valve device. According to the present invention, efforts for adjusting heights between both of pressure taps during connecting of valves and flow measurement parts are not required and the problem of leakage and thus installation costs could be reduced as well.

Advantageous Effects of Invention

According to the present invention, efforts for adjusting heights between both of the pressure taps during connecting of the valves and flow measurement parts are not required and thereby installation time and cost of installation are drastically decreased. Also, the possibility of leakage and manufacturing costs are reduced by integrating valves and flow measurement parts into a one-body valve device.

BEST MODE FOR CARRYING OUT THE INVENTION

The present invention will now be described more fully with reference to the accompanying drawings, in which exemplary embodiments of the invention are shown.

Figure 1:
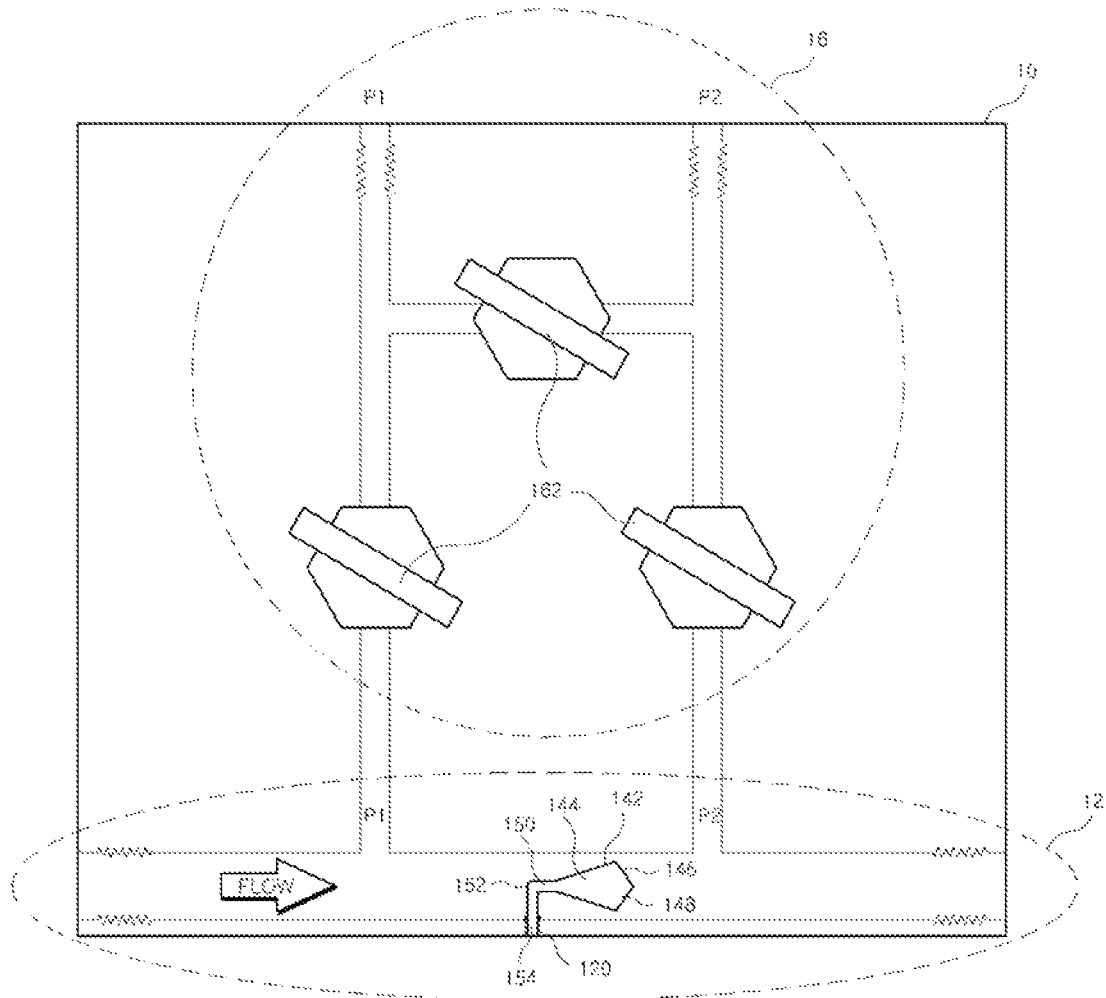
FIG. 1 shows a valve device for flow measurement in which a cone type venturi is integrated according to an embodiment of the present invention.

FIG. 1 shows a valve device for flow measurement in which cone type venturi is integrated according to an embodiment of the present invention. Referring to FIG. 1, the valve device for flow measurement in which a cone type venturi is integrated according to an embodiment of the present invention comprises a main body 10 constructed of stainless steel; Venturi path 12 for passing-by fluid which is formed in the main body 10 by penetrating through the main body 10 in a horizontal direction; Venturi cone 14 which is mounted between the first pressure point P1 and the second pressure point P2 in the venturi path 12, and wherein the venturi cone 14 acts to make the pressure of fluid at the second pressure point P2 relatively lower than that of first pressure point P1; and valve path 16.

The venturi path 12 comprises a hole 120. In this venturi path 12, a point of certain distance from the inlet side is defined as the first pressure point and the other point of certain distance from the outlet side is defined as the second pressure point P2.

The venturi cone 14 is mounted between the first pressure point P1 and the second pressure point P2 in the venturi path 12. Also, the venturi cone 14 comprises a first cone body 144 having a mild slope surface 142 faced to the first pressure point P1, a second cone body 148 having a steep slope surface 142 faced to the second pressure point P2, and a fixing leg 154 extending (150) from the cone end of the first cone body 144 to the direction of center axis for a predetermined length. The fixing leg 154 is bent (152) downward, and the bent end is inserted into the hole 120 of the venturi path 12 and attached by a welding process at the bottom. The venturi cone 14 acts to make the pressure of fluid at the second pressure point P2 relatively lower than that of first pressure point P1.

The valve path 16 comprises fluid paths which are formed by penetrating holes in a vertical direction with respect to the venturi path 12, and then the valve path 16 is connected with the first pressure point P1 and the second pressure point P2. Also the valve path 16 comprises valves 162 for switching of fluid flowing through the fluid paths.

When the cone type venturi is formed after valve path 16 has been established, a packing portion composed of PTFE (Poly Tetra Fluoro-Ethylene) which is called Teflon™ or synthetic polymer polyamide which is called Nylon™ could be damaged by the heat provided during welding process of venturi cone. Therefore, it is preferred to form the valve path 16 after the welding process of venturi cone 14 has been performed.

Also, it is preferred that, in the first cone body 144 and the second cone body 148, a center hole 149 extends from a cone end of the venturi cone in a center axis direction.

Figure 2:
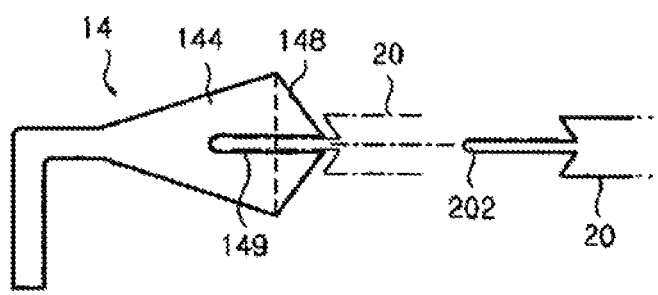
FIG. 2 shows a diagram for showing how to install the venturi cone to the main body.

FIG. 2 shows a diagram for showing how to install the venturi cone to the main body. Referring to FIG. 2, when the venturi cone is installed between the first pressure point P1 and the second pressure point P2 in the venturi path 12, a centering jig 20 is used for adjusting the position of the first cone body 144 and the second cone body 148 to the center of fluid path accurately.

The centering jig 20 has a center projection 202 protruding toward outside. The center projection 202 fits the center hole 149 of the second cone body 148.

Figure 3:
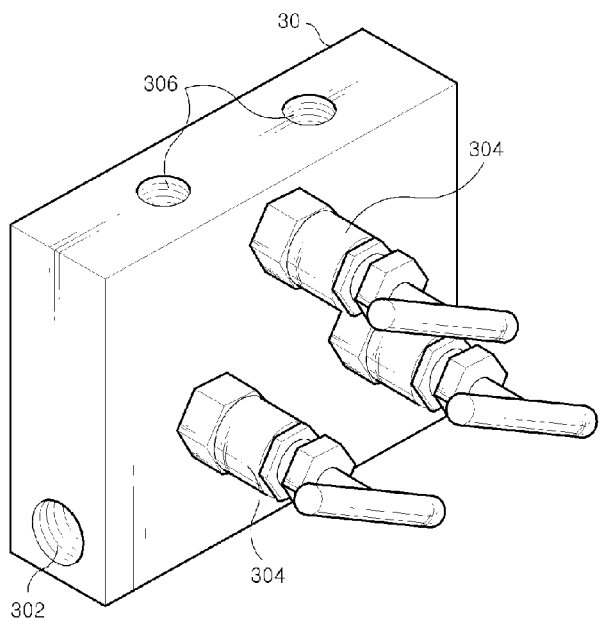
FIG. 3. shows a valve device for flow measurement in which the cone type venturi is integrated according to an embodiment of the present invention.

FIG. 3 shows a valve device for flow measurement in which cone type venturi is integrated according to an embodiment of the present invention. Referring to FIG. 3, the valve device comprises a main body 30, and a venturi path formed in the lower portion of the main body 30. An inlet of the venturi path 12 corresponds to inlet port 302. The valves 304 are mounted in the valve path which is connected to the venturi path. An outlet of the venturi path 12 corresponds to sensor port 306.

According to the present invention, the venturi cone is formed in the venturi path in the lower portion of the main body, and then valve paths are formed by processing, so that efforts for adjusting heights between both of the pressure taps during connecting of the valves and flow measurement parts are not required and installation time and cost of installation are drastically decreased. Also, the possibility of leakage as well as manufacturing costs are also reduced by integrating valves and flow measurement parts into a one-body valve device.

The invention claimed is:

1. A cone type venturi integrated valve device comprising:
   a main body having a venturi path which penetrates through the main body in a horizontal direction and a hole which penetrates through the main body from the venturi path to a bottom of the main body, wherein the venturi path includes an inlet, an outlet, a first pressure point at a distance from the inlet, and a second pressure point at a distance from the outlet;
   a venturi cone mounted between the first pressure point and the second pressure point in the venturi path of the main body;
   a valve path which penetrates through the main body in a vertical direction with respect to the venturi path, the valve path being connected with the first pressure point and the second pressure point of the venturi path; and
   valves disposed in the valve path for switching of fluid flowing through the valve path,
   wherein the venturi cone includes a first cone body having a mild slope surface facing the first pressure point, a second cone body having a steep slope surface facing the second pressure point, and a fixing leg extending from a cone end of the first cone body in the direction of center axis for a predetermined length,
   wherein the fixing leg is bent downward and a bent end of the fixing leg is inserted into the hole of the main body and attached by welding, and
   wherein the venturi cone acts to make the pressure of fluid at the second pressure point lower than the pressure of fluid at the first pressure point.

2. The cone type venturi integrated valve device of claim 1, wherein the second cone body includes a center hole extending from a cone end of the second cone body in a center axis direction.

3. The cone type venturi integrated valve device of claim 2, wherein the main body is stainless steel.

4. The cone type venturi integrated valve device of claim 1, wherein the main body is stainless steel.

5. The cone type venturi integrated valve device of claim 1, wherein the main body is a single piece of stainless steel which includes the venturi path, the hole, and the valve path.

6. The cone type venturi integrated valve device of claim 1, wherein the main body is a single unitary piece which includes the venturi path, the hole, and the valve path.

7. The cone type venturi integrated valve device of claim 1, wherein the fixing leg does not include a through hole.

8. The cone type venturi integrated valve device of claim 1, wherein the fixing leg is welded to the main body from the bottom of the main body.

* * * * *